United States Patent
Klomp et al.

(10) Patent No.: US 11,961,398 B2
(45) Date of Patent: Apr. 16, 2024

(54) QUALITY DETERMINING METHOD, QUALITY DETERMINING DEVICE, AND MOTOR VEHICLE

(71) Applicant: Volkswagen Aktiengesellschaft, Wolfsburg (DE)

(72) Inventors: Sven Klomp, Uetze Dollbergen (DE); Stephan Max, Gifhorn (DE); Kai Franke, Stendal (DE); Peter Baumann, Braunschweig (DE); Christian Jördens, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 279 days.

(21) Appl. No.: 17/765,762

(22) PCT Filed: Sep. 16, 2020

(86) PCT No.: PCT/EP2020/075916
§ 371 (c)(1),
(2) Date: Mar. 31, 2022

(87) PCT Pub. No.: WO2021/036378
PCT Pub. Date: Apr. 8, 2021

(65) Prior Publication Data
US 2022/0358838 A1 Nov. 10, 2022

(30) Foreign Application Priority Data
Oct. 1, 2019 (DE) .......... 102019215095.0

(51) Int. Cl.
*G08G 1/096* (2006.01)
*G08G 1/01* (2006.01)
*G08G 1/0967* (2006.01)

(52) U.S. Cl.
CPC ..... *G08G 1/096725* (2013.01); *G08G 1/0112* (2013.01); *G08G 1/0125* (2013.01);
(Continued)

(58) Field of Classification Search
CPC .......... G08G 1/096725; G08G 1/0112; G08G 1/0125; G08G 1/0141; G08G 1/0145; G08G 1/096; G08G 1/096775
See application file for complete search history.

(56) References Cited

U.S. PATENT DOCUMENTS

| | | |
|---|---|---|
| 8,527,199 B1 | 9/2013 | Burnette et al. |
| 2013/0253754 A1 | 9/2013 | Ferguson et al. |

(Continued)

FOREIGN PATENT DOCUMENTS

| | | |
|---|---|---|
| DE | 102012007367 A1 | 11/2012 |
| DE | 102011122297 A1 | 6/2013 |

(Continued)

OTHER PUBLICATIONS

PCT/EP2020/075916. International Search Report (dated Dec. 17, 2020).

*Primary Examiner* — Mathew Franklin Gordon
(74) *Attorney, Agent, or Firm* — Peter Zura; LOZA & LOZA, LLP

(57) ABSTRACT

Technologies and techniques for quality determination for a traffic system. First traffic parameter data is acquired from the traffic system, indicative of a parameter of the traffic system. Second traffic parameter data is acquired, indicative of another parameter of the traffic system, wherein the second traffic parameter data originate from a plurality of traffic participants. The parameter from the first traffic parameter data and second traffic parameter are obtained, wherein the parameter obtained from the first traffic parameter data is compared to the parameter obtained from the (Continued)

second traffic parameter data in order to determine the quality of the first traffic parameter data.

20 Claims, 3 Drawing Sheets

(52) U.S. Cl.
CPC ......... *G08G 1/0141* (2013.01); *G08G 1/0145* (2013.01); *G08G 1/096* (2013.01); *G08G 1/096775* (2013.01)

(56) References Cited

U.S. PATENT DOCUMENTS

| | | |
|---|---|---|
| 2014/0055288 A1 | 2/2014 | Menzel et al. |
| 2018/0150086 A1 | 5/2018 | Nobukawa et al. |
| 2019/0019410 A1 | 1/2019 | Sheynman et al. |

FOREIGN PATENT DOCUMENTS

| | | |
|---|---|---|
| DE | 102012216788 A1 | 5/2014 |
| DE | 102013204241 A1 | 9/2014 |
| DE | 102013220662 A1 | 4/2015 |
| DE | 102015005902 A1 | 2/2016 |
| DE | 102016111371 A1 | 12/2016 |
| DE | 102016217558 A1 | 3/2018 |
| EP | 2979261 B1 | 8/2019 |

QUALITY DETERMINING METHOD, QUALITY DETERMINING DEVICE, AND MOTOR VEHICLE

RELATED APPLICATIONS

The present application claims priority to International Patent App. No. PCT/EP2020/075916 to Klomp, et al., titled "Quality Determining Method, Quality Determining Device, and Motor Vehicle", filed Sep. 16, 2020, which claims priority to German Patent App. No. 10 2019 215 095.0, filed on Oct. 1, 2019, the contents of each being incorporated by reference in their entirety herein.

TECHNICAL FIELD

The present disclosure relates to a quality determining method for a traffic system, a quality determining device and a motor vehicle.

BACKGROUND

In general, systems are known which are integrated in vehicles, for example, to obtain traffic light phases or other traffic data in road traffic, to evaluate these, and the like.

For example, an approach speed to a signal system (e.g., traffic light) can be adapted based on a changeover time of a signal system received by a vehicle, so that the vehicle does not have to stop in front of the signal system, whereby gasoline can be saved, a subjective waiting time can be shortened, and the like.

A method is known from the Patent Application Publication US 2014/0055288, which checks a characteristic derived from messages from a signal system and compares it to a feature recorded by it. Here, however, reception interferences, a faulty signal generation (for example, due to a calibration error, a poor prediction, and the like) could lead to an incorrect result. Furthermore, no statistical statement about the signal system can be made in this way.

A method for comparing signal phase data to movement data of vehicles is known from Patent Application Publication US 2018/0150086. However, this method does not use the data of a plurality of traffic participants.

SUMMARY

Aspects of the present disclosure are directed to providing a quality determining method, a quality determining device and a motor vehicle that at least partially overcome the above-mentioned disadvantages.

Aspects of the technologies and techniques for quality determination, a quality determination device and/or motor vehicle according to the present disclosure are shown in the features recited in the independent claims below.

Additional aspects of the present disclosure will be apparent from the dependent claims and the detailed description of the present disclosure below.

In some examples, a quality determining method is disclosed for a traffic system comprising: acquiring first traffic parameter data from the traffic system indicative of a parameter of the traffic system; acquiring second traffic parameter data indicative of the parameter of the traffic system, wherein the second traffic parameter data originate from a plurality of traffic participants; obtaining the parameter form the first traffic parameter data; obtaining the parameter form the first traffic parameter data; and comparing the parameter obtained from the first traffic parameter data to the parameter obtained from the second traffic parameter data in order to determine a quality of the first traffic parameter data.

In some examples, a quality determining device is disclosed, configured for executing a quality determining method described herein.

In some examples, a motor vehicle is disclosed, comprising a quality determining device as disclosed herein.

As mentioned above, systems are known whereby traffic data can be received from a traffic system.

It has been found, however, that such systems are error-prone or inaccurate, potentially preventing comfortable, economical, environmentally friendly, safe, and/or speedy driving.

Furthermore, data (e.g., a confidence level) transmitted by such systems can be analyzed in different ways, with different results being obtained from different evaluations of the same data, which is generally undesirable.

Moreover, it has been found that there is no method available for determining correctness, precision, quality, accuracy, and the like, of the received data.

Accordingly, a quality determining method is disclosed for a traffic system comprising: acquiring first traffic parameter data from the traffic system indicative of a parameter of the traffic system; acquiring second traffic parameter data indicative of the parameter from the traffic system, wherein the second traffic parameter data originate from a plurality of traffic participants; obtaining the parameter form the first traffic parameter data; obtaining the parameter form the second traffic parameter data; and comparing the parameter obtained from the first traffic parameter data to the parameter identified from the second traffic parameter data in order to determine the quality of the first traffic parameter data.

The traffic system may be any arrangement of elements on a traffic route (land or water) that are configured to regulate a traffic flow.

BRIEF DESCRIPTION OF THE DRAWINGS

Embodiments of the present disclosure are now described by way of example and with reference to the accompanying figures, in which.

DETAILED DESCRIPTION

Figure 1:
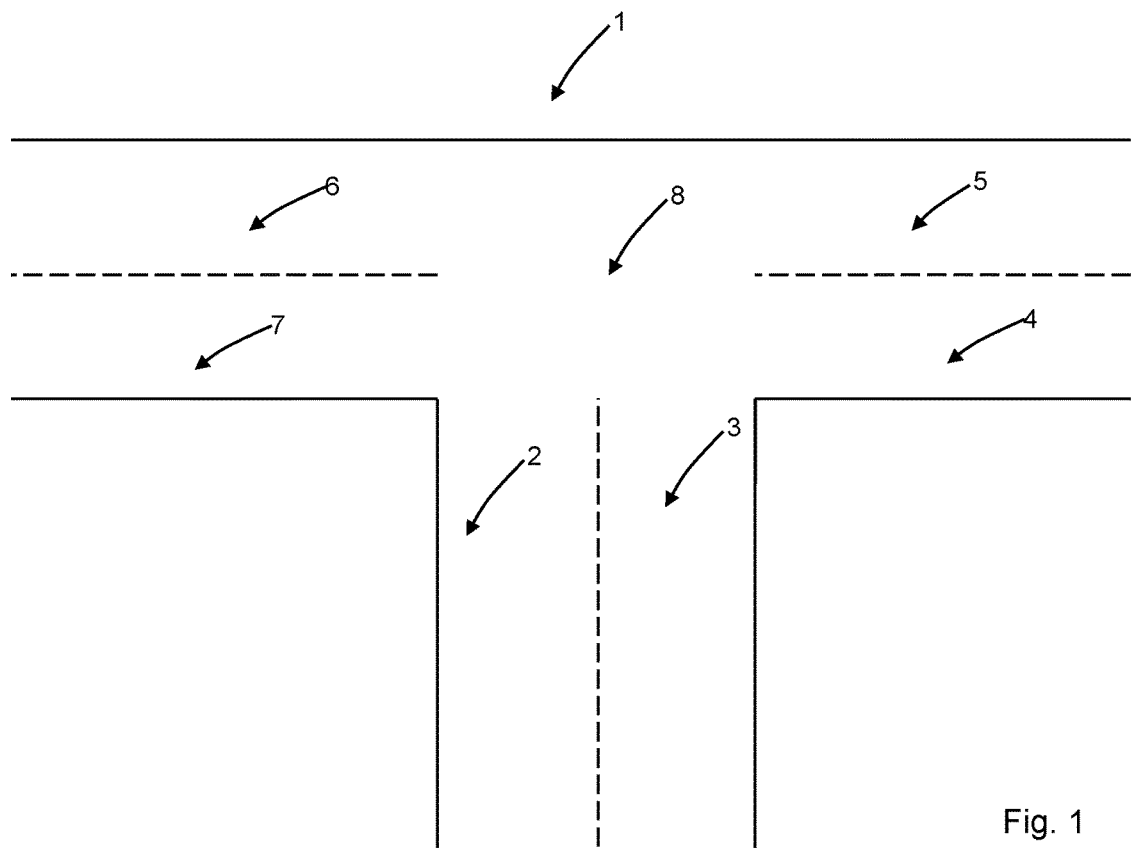
FIG. 1 shows a schematic of an intersection at which a quality determining method can be executed according to some aspects of the present disclosure.

In some examples, an "element" as used herein may be configured as a signaling system, such as a traffic light or traffic light system, a roundabout with a corresponding control technology, an acoustic signaling system, a haptic signaling system, a signaling system based on electromagnetic signals (e.g., without transmitting a stimulus that can be detected by a road user, e.g., for an autonomously driving vehicle), and the like, whereby a combination of several different elements may also be included. The traffic system may be implemented, for example, on a traffic road having at least one light signal system (e.g., a traffic light). The traffic system may further include a control device configured to detect, estimate, obtain, acquire, and/or send data indicative of at least one transmitted signal, traffic control information, and the like (e.g., a traffic light phase).

A quality determining method according to the present disclosure may be configured to acquire first traffic parameter data. The first traffic parameter data are, for example, provided by the switching array and may correspond to the data described above. For example, the control device can determine a traffic light phase of at least one traffic light of the traffic system and provide an estimate of how long this traffic light phase will (still) last. This estimate may be obtained from the traffic system as first traffic parameter data in a quality determination process according to some aspects.

For example, the traffic system may transmit the first traffic parameter data (cyclically) so that the first traffic parameter data is received in a quality determination method according to the invention. However, acquiring may also include sending a request to the traffic system so that the traffic system, in response to the request, provides the first traffic parameter data. In addition, in some embodiments, acquiring may comprise downloading the first traffic parameter data (e.g., from a server).

In some examples, during a quality determination, acquiring may also be performed by a combination of at least two types of acquiring. For example, a portion of the first traffic parameter data may be transmitted (cyclically) by the traffic system, while another portion is provided upon request, and the like. The first traffic parameter data may be indicative of a parameter of the traffic system, for example, during a quality determination process, the parameter may be determined from the first traffic parameter data.

As already discussed, a parameter may include a traffic light phase. Furthermore, a parameter may include a (estimated or defined) time at which the traffic light phase changes to a different traffic light phase. Moreover, the parameter may comprise a road topology, a lane information, a recommended speed, a probable time to a phase change and a confidence level. In some examples, a confidence level of a signal (e.g., an estimated measurement error) is compared to a probable time to a phase change. In some examples, it is checked, whether the first traffic parameter data are sent with a required frequency (e.g., based on a predetermined standard).

Generally, the first traffic parameter data are not limited to being indicative for exactly one parameter, because in a quality determining method according to the invention, it is also possible to obtain a plurality (at least one) of parameters form the first traffic parameter data.

In some examples, a quality determining process may furthermore include an acquiring of second traffic parameter data. The second traffic parameter data may include a data structure that is the same as or different from the first traffic parameter data. However, a source of the second traffic parameter data may typically be different from the source of the first traffic parameter data. The second traffic parameter data are typically acquired from a plurality of traffic participants, e.g., the plurality of traffic participant provides the second traffic parameter data on a remote server or the like. A traffic participant may generally be considered any vehicle that is controlled by the traffic system such as a motor vehicle, a motor bike, a pedestrian (that is equipped with a corresponding device to provide the first and second traffic parameter data), a bicycle and the like. In general, each traffic participant may be configured (or have a corresponding device) to execute the quality determining method according to the present disclosure, as well as provide the second traffic parameter data.

In some examples, the second traffic parameter data may be obtained by a device that is associated with one (or many) traffic participants. For example, each of the plurality of traffic participants may be equipped with a camera or the like, so that each traffic participant can record traffic light phases of a traffic light with a corresponding lane assignment, which traffic light phases are transmitted as second traffic parameter data to a device configured for executing a quality determining method according to the invention.

In some examples, if the second traffic parameter data originates from a plurality of traffic participants, e.g., if there is a plurality of data sets, the second traffic parameter data is first combined into one data set, for example, by performing a statistical analysis (accumulation, averaging, determining a measurement error, and the like). In some examples, a plurality of parameters are first obtained from the plurality of data sets so that a final parameter can be obtained from the plurality of parameters, for example, by statistical analysis.

In some examples, a quality determining process may include obtaining the parameter from the first traffic parameter data, and obtaining the parameter form the second traffic parameter data, as already discussed. Furthermore, a quality determining process may include comparing the parameter obtained from the first traffic parameter data to the parameter obtained from the second traffic parameter data. The comparing may include determining a deviation, a difference, a quotient, a rate, a significance, and the like, which enables a conclusion as to whether and to what extent the parameter obtained from the first traffic parameter data deviates from the parameters obtained from the second traffic parameter data.

From this, a quality of the first traffic parameter data may be determined. For example, the first traffic parameter data may be incorrect (for example, due to an incorrect traffic light-lane assignment, an inaccurate estimation of a traffic light phase and the like), so that the parameter obtained from the first traffic parameter data is also incorrect. If the determined deviation and the like is above a predetermined threshold, it can be determined therefrom that the quality of the first traffic parameter data is insufficient, or, if the determined deviation and the like is below (or equal to) the predetermined threshold, it can be determined therefrom that the quality of the first traffic parameter data is sufficient.

Therefore, in some examples, a quality determining process may include determining the quality of the first traffic parameter data based on the comparison. Based on the quality, a quality determination device may determine whether the first traffic parameter data are considered in a future use of the traffic system. The quality may generally be a numerical value, a designation (such as "pass" or "sufficient"), and the like. If the quality is determined to be insufficient, or if it is below a predetermined value, a decision can be made not to consider the first traffic parameter data if a traffic participant uses the traffic system at a point in time that is after the determination of the quality.

For example, if the first traffic parameter data is indicative of a waiting time at a traffic light, a decision can be made that the waiting time will not be displayed to an occupant (e.g., a driver) of the traffic participant if the quality is insufficient, since it can be assumed that the wait time obtained from the first traffic parameter data is incorrect. This can be done via geofencing, for example. In some examples, this can be done via an index (e.g., blacklist), in which, for example, each traffic light is listed with a unique identifier (e.g., ID), so that an identification of the identifier can be used to infer a position. If the quality is sufficient, the wait time can be displayed. In some examples, the comparison may include determining a statistical deviation of the parameter obtained from the first traffic parameter data from the parameter obtained from the second traffic parameter data. The statistical deviation may be based on a sample test between the parameter obtained from the first traffic parameter data and the parameter obtained from the second traffic parameter data, such as a t-test, a chi-square test, a significance test, and the like. The quality can then be determined from the determined statistical deviation or from a significance value, and the like.

In some examples, the comparison may include a comparison of an obtained actual assignment of lanes to a signal system and an assignment of lanes to the signal system provided by the traffic system, so that if the two assignments differ, the first traffic parameter data is not considered in a future use of the traffic system. In some examples, the parameter may include at least one traffic control information (e.g., a traffic light phases), as already discussed. In some examples, the at least one traffic control information may be associated with a lane information, as described herein. In configurations where the at least one traffic control information includes one or more traffic light phases, the parameter may further include an anticipated phase change of the traffic light phase.

In some examples, the quality determining process may further include predicting the phase change based on the parameter obtained from the first traffic parameter data, when a quality is above a predetermined threshold. This may be the case if a probable wait time or a probability for a future phase change time is obtained as parameter from the first traffic parameter data. If a quality is above a predetermined value, a phase change can be predicted from the given probability with a (predetermined) accuracy, which may depend on the quality. In some examples, the quality determining process may further include transmitting the predicted phase change. For example, the predicted phase change can be transmitted to a remote server through network interfaces, radio protocols (e.g., mobile Internet), and the like, so that other traffic participants can access this information, so that advantageously not every traffic participant needs to execute a quality determining method according to the invention.

In some examples, the quality determining process may include adjusting a speed based on the predicted phase change. For example, a traffic participant may approach a traffic light at which it is currently not permitted to continue driving. For example, a speed can be reduced such that the traffic participant does not have to come to a complete stop, so that he does not have to accelerate again when he is allowed to continue driving, and the like. However, adjusting the speed may also include accelerating or coming to a complete stop.

In some examples, the second traffic parameter data may include swarm data, wherein not only the plurality of traffic participants are a part of the swarm, but also other systems that are configured for executing a quality determining process, such as a traffic monitoring system, a cell phone, and the like, whereby advantageously an accuracy of the parameter obtained from the second traffic parameter data is increased. In some examples, the traffic parameter data may include signal phase and time data. In some examples, the traffic parameter data may include road topology data.

As is generally known, traffic systems can transmit signals such as SPaT data (signal phase and time) and road topology data (MAP) according to ISO TS 19091. In some examples, signals including first traffic parameter data can be used to execute a quality determining method according to the present disclosure. For example, a traffic system (e.g., a traffic light) can provide information about whether and how many persons are present at an intersection, as well as transmit switching times (phase changes), for example, via a pWLAN (public wireless local area network). In some examples, this information (e.g., first traffic parameter data according to the invention) can be transmitted to a vehicle via a cellular connection (e.g., radio protocol data) or, as discussed, via direct communication, such as pWLAN. A source providing the first traffic parameter data can be verified by means of a public key infrastructure (PKI) and/or with a signature of the first traffic parameter data.

In some examples, the first traffic parameter data (in the case of MAP) are indicative of a structure of an intersection, such as, for example, an arrangement of lanes and the direction of travel they are assigned to (e.g., separate left-turn lane, shared right-straight lane, and the like), and/or indicative of traffic signal groups with an assignment to the arrangement of lanes, e.g., which lane is associated with which traffic signal group. In some examples, the first traffic parameter data (in the case of SPaT) may be indicative of current phase information of the individual traffic signal groups. They may also include an estimate of the next switchover time. In some examples, the first traffic parameter data may be configured as a combination of MAP and SPaT data.

In some examples, an optimal approach speed to a traffic light can be determined, so that fuel can advantageously be saved. Should a driver of a motor vehicle already stand at an intersection, the driver can be informed about the remaining wait time. This can advantageously reduce a subjective wait time.

Turning to FIG. 1, the illustrative drawing shows an intersection 1 having several lanes 2 to 7 and a conflict zone 8, wherein passing through the conflict zone 8 is controlled by a traffic light (not shown). Information about lanes 2 to 7 are contained in the road topology data, while phase information is contained in the signal phase and time data, so that passing through conflict zone 8 is controlled by a combination of road topology data and signal phase and time data.

In some examples, a road topology may be obtained based on the road topology data (first traffic parameter data), i.e., a traffic light is assigned to a lane, for example, wherein the road topology is furthered obtained using an actually travelled route (from the second traffic parameter data). The actually travelled route can be obtained via geodesics (for example, GPS), odometry and the like. The actually travelled route can also be obtained from obtained driving maneuvers (left, right, straight and the like). Thus, a quality of road topology data can be determined.

In some examples, the signal phase and time data (first traffic parameter data) may be compared to a visual check of a current phase based on a camera (which acquires second traffic parameter data). Thus, a quality of the first traffic parameter data can be determined.

In some examples, a failed signal group assignment between road topology data, and signal phase and time data can also occur, which can advantageously be checked by determining the quality of the road topology data, and the signal phase and time data. With this, it can be checked whether all required signal groups (or traffic lights) of a traffic system are included in the road topology data as well as in the signal phase and time data. Furthermore, revision sums of the road topology data, and the signal phase and time data can be compared.

Furthermore, as is generally known, mandatory fields (based on a standard) may be included in both the road topology data, and the signal phase and time data, wherein in some embodiments, it may be determined in each case whether all mandatory fields are sent or received, so that determining the quality is advantageously improved. Generally, if the quality is determined to be below a predetermined threshold value, receiving of first traffic parameter data from a traffic system can be disabled in a motor vehicle.

In some examples, the quality determining process may further include adjusting a route guidance based on the parameter. For example, it may be determined that an incorrect traffic light-lane assignment of the first traffic parameter data has occurred. This can lead to a situation where, if there are two alternative (without traffic lights equally fast) routes to a destination, a traffic participant would have to wait for a long time at a traffic light if an incorrect traffic light-lane assignment causes a traffic participant's navigation to be incorrect. A route guidance (i.e., a navigation) can then be adjusted by correcting the traffic light-lane assignment so that an alternative (faster) route can be calculated.

Some embodiments of the present disclosure relate to a quality determining device configured for executing a quality determining process. The quality determining device may be a switching array in a motor vehicle. For example, a quality determining device may have features that are configured for executing the quality determining method. For example, the quality determining device may include, but is not limited to, a network interface for acquiring the first traffic parameter data, an image capturing feature for acquiring the second traffic parameter data, a processor for obtaining the parameters from the first and from the second traffic parameter data and for comparing the obtained parameters. For example, the method may also be executed by a central board computer, and the like, integrated in a motor vehicle.

Some examples relate to a motor vehicle comprising a quality determining device according to the present disclosure. The motor vehicle may be any vehicle driven by a motor (e.g., internal combustion engine, electric machine, etc.) such as an automobile, a motorcycle, a truck, a bus, agricultural or forestry tractors participating in a traffic flow.

In some examples, a quality determining process may be executed in a vehicle (e.g., via direct communication). However, the present disclosure is not to be limited thereto, as the first and second traffic parameter data may be provided by a backend (e.g., a remote server) or may also take place in the (or in another) backend, so that a motor vehicle according to the invention may also be configured for transmitting second traffic parameter data (e.g., traffic light phases recorded by a camera) to the backend (e.g., via mobile communications).

Figure 2:
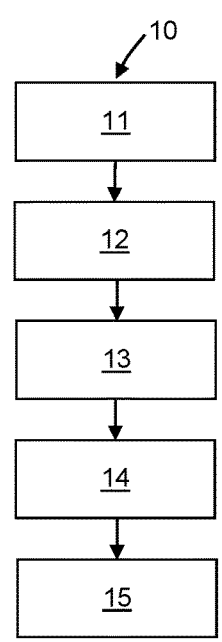
FIG. 2 shows a quality determining method according to some aspects of the present disclosure.

Turning to FIG. 2, the illustrative drawing shows an embodiment of a quality determining method 10 according to some aspects of the present disclosure. In 11, first traffic parameter data are acquired, as described herein. In 12, second traffic parameter data are acquired, as described herein. In 13, the parameter from the first traffic parameter data is obtained, as described herein. In 14, the parameter from the second traffic parameter data is obtained, as described herein. In 15, the parameter obtained from the first traffic parameter data is compared to the parameter obtained from the second traffic parameter data, as described herein.

Figure 3:
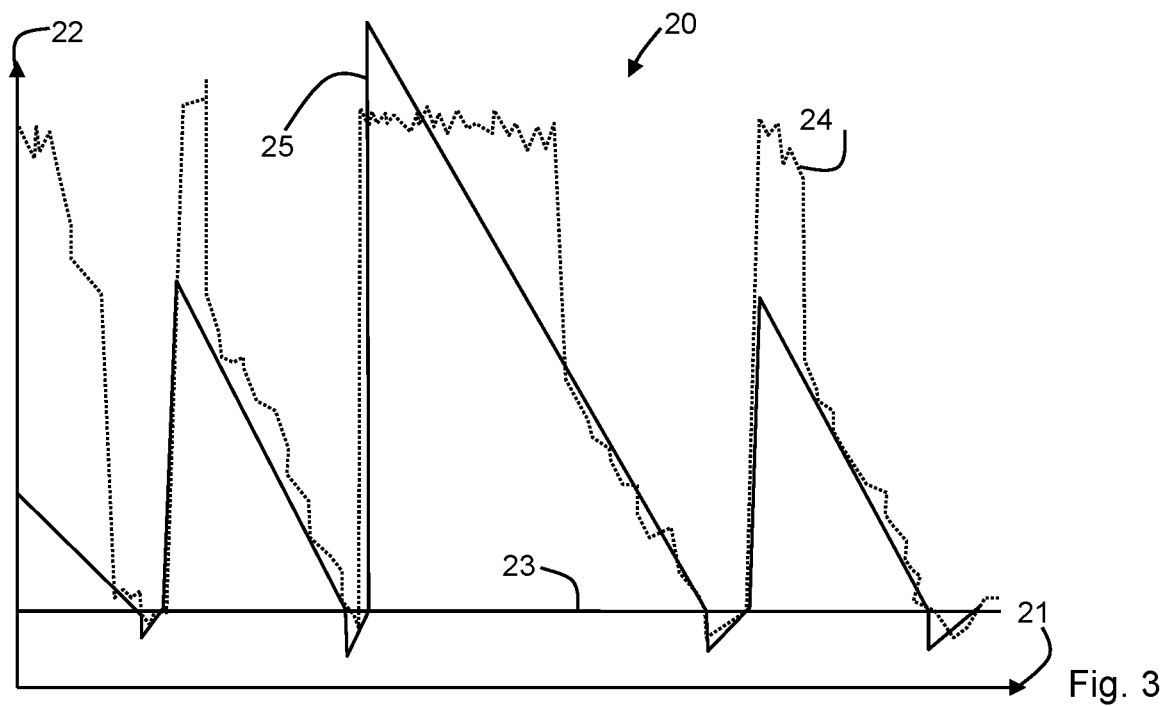
FIG. 3 shows a coordinate system for comparing the parameter obtained from the first traffic parameter data to the parameter obtained from the second traffic parameter data according to some aspects of the present disclosure.

FIG. 3 shows a coordinate system 20 on which a past time is plotted on an abscissa 21 and on which a time until a phase change of a traffic light is shown on an ordinate 22. In this example, two traffic light phases are shown here for simplicity, but the present invention is not limited to two traffic light phases. Furthermore, a zero line 23 is shown, wherein values below the zero line 23 indicate a traffic light phase which causes a traffic participant to stop (e.g., red) and values above the zero line 23 indicate a traffic light phase which causes the traffic participant to continue driving (e.g., green).

The coordinate system 20 also includes a probable time 24 (dotted line) at which a phase change is to occur, which is based on an obtaining according to the invention from first traffic parameter data transmitted by a signal light system (as a traffic system according to the invention).

Furthermore, the coordinate system 20 includes a real time 25 (solid line) at which a phase change takes place, which is based on an obtaining according to the invention from second traffic parameter data originating from swarm data from a plurality of traffic participants. The second traffic parameter data has been obtained by monitoring the traffic system by the plurality of traffic participant, while the first traffic parameter data is based on an estimation of a probability of when a phase change occurs. Thus, a comparison according to the invention of the probable time 24 (as a parameter obtained from the first traffic parameter data) and the real time 25 (as a parameter obtained from the second traffic parameter data) can take place.

Figure 4:
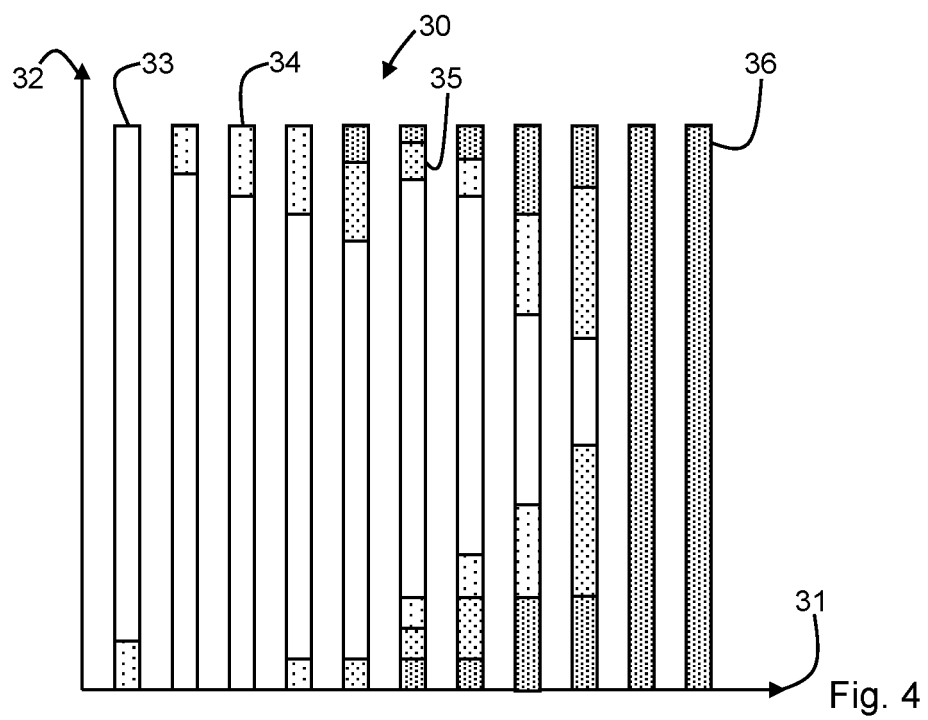
FIG. 4: shows a bar graph illustrating a precision of a predicted time according to some aspects of the present disclosure.

FIG. 4 shows a bar graph 30, wherein a predicted time (as a parameter obtained from the first traffic parameter data) prior to a phase change is shown on an abscissa 31, and wherein a precision of the predicted time compared to an actual time (as a parameter obtained from the second traffic parameter data) is shown on an ordinate 32. The bars of the bar graph 30 have different fill levels 33 to 36, wherein the fill level 33 (no fill) illustrates a precision of less than one second. This means, that the actual time is one second longer or shorter than the predicted time. Fill level 34 illustrates a precision of less than two seconds. Fill level 35 illustrates a precision of less than three seconds. Fill level 36 illustrates a precision of less than five seconds. If a fill level in the bar graph 30 is above another fill level, then this means that the predicted time is longer than the actual time. If a fill level is below another fill level, then this means that the predicted time is shorter than the actual time. For example, at the very left bar of the bar graph 30, ninety percent of all predictions are accurate to one second, while the remaining ten percent are accurate to two seconds.

Figure 5:
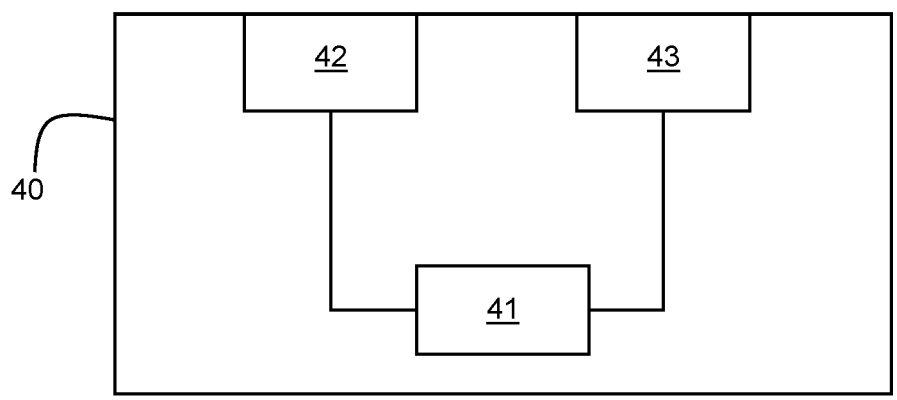
FIG. 5 shows a motor vehicle having a quality determining device according to some aspects of the present disclosure.

FIG. 5 shows a motor vehicle 40 having a quality determining device 41 according to some aspects of the present disclosure, which, in this embodiment, is accomplished as a central board computer, and which is configured for executing a quality determining method according to the present disclosure. The quality determining device 41 controls a network interface 42 through which first and second traffic parameter data are received. Furthermore, the quality determining device 41 controls a camera device 43, which is configured for acquiring second traffic parameter data (as camera data) by recording traffic light phases. Thus, the motor vehicle 40 is further configured for providing the second traffic parameter data via the network interface 42 to a remote server, for example, so that said second traffic parameter data can be added to swarm data.

REFERENCE SIGNS LIST

1 Intersection
2-7 Lane
8 Conflict zone
10 Quality determining method
11 Acquiring first traffic parameter data
12 Acquiring second traffic parameter data
13 Detecting parameter form the first traffic parameter data
14 Detecting parameter form the second traffic parameter data
15 Comparing the parameter obtained from the first traffic parameter data to the parameter obtained from the second traffic parameter data
20 Coordinate system
21 Abscissa
22 Ordinate
23 Zero line
24 Probable time
25 Real time
30 Bar graph
31 Abscissa
32 Ordinate
33 Fill level for precision of less than one second
34 Fill level for precision of less than two seconds
35 Fill level for precision of less than three seconds
36 Fill level for precision of less than five seconds
40 Motor vehicle
41 Quality determining method
42 Network interface
43 Camera device

The invention claimed is:

1. A method for determining quality of signals for a traffic system comprising:
    acquiring first traffic parameter data from the traffic system indicative of a parameter of the traffic system;
    acquiring second traffic parameter data indicative of the parameter of the traffic system, wherein the second traffic parameter data originate from a plurality of traffic participants;
    obtaining the parameter form the first traffic parameter data;
    obtaining the parameter form the second traffic parameter data;
    comparing the parameter obtained from the first traffic parameter data to the parameter obtained from the second traffic parameter data in order to determine the quality of the first traffic parameter data; and
    adjusting a route guidance based on the parameter.

2. The method of claim 1, further comprising:
    determining the quality of the first traffic parameter data based on the comparison; and
    deciding, based on the quality, whether the first traffic parameter data are to be considered in a future use of the traffic system.

3. The method of claim 1, wherein the comparing comprises determining a statistical deviation of the parameter obtained from the first traffic parameter data from the parameter obtained from the second traffic parameter data.

4. The method of claim 1, wherein the parameter comprises at least one traffic control information, comprising a traffic light phase, and associated with a lane information.

5. The method of claim 4, wherein the parameter further comprises an anticipated phase change of the traffic light phase.

6. The method of claim 5, further comprising predicting the anticipated phase change, based on the parameter obtained from the first traffic parameter data when the quality is above a predetermined threshold.

7. The method of claim 6, further comprising adjusting a speed of a vehicle based on the predicted phase change.

8. The method of claim 1, wherein the second traffic parameter data comprises swarm data.

9. The method of claim 1, wherein the first traffic parameter data comprises one or more of a signal phase, time data, and/or road topology data.

10. A quality determining device for a traffic system comprising:
    a network interface for acquiring first traffic parameter data from the traffic system indicative of a parameter of the traffic system;
    an image capturing device for acquiring second traffic parameter data indicative of the parameter of the traffic system, wherein the second traffic parameter data is associated with a plurality of traffic participants;
    a processing device, operatively coupled to the image capturing device and network interface, wherein the processing device is configured to
        obtain the parameter from the first traffic parameter data;
        obtain the parameter from the second traffic parameter data;
        compare the parameter obtained from the first traffic parameter data to the parameter obtained from the second traffic parameter data in order to determine the quality of the first traffic parameter data; and
        adjust a route guidance based on the parameter.

11. The quality determining device of claim 10, wherein the processing device is configured to:
    determine the quality of the first traffic parameter data based on the comparison; and
    decide, based on the quality, whether the first traffic parameter data are to be considered in a future use of the traffic system.

12. The quality determining device of claim 10, wherein the processing device is configured to compare by determining a statistical deviation of the parameter obtained from the first traffic parameter data from the parameter obtained from the second traffic parameter data.

13. The quality determining device of claim 10, wherein the parameter comprises at least one traffic control information, comprising a traffic light phase, and associated with a lane information.

14. The quality determining device of claim 13, wherein the parameter further comprises an anticipated phase change of the traffic light phase.

15. The quality determining device of claim 14 wherein the processing device is configured to predict the anticipated phase change, based on the parameter obtained from the first traffic parameter data when the quality is above a predetermined threshold.

16. The quality determining device of claim 15, wherein the processing device is configured to adjust a speed of a vehicle based on the predicted phase change.

17. The quality determining device of claim 10, wherein the second traffic parameter data comprises swarm data.

18. The quality determining device of claim 10, wherein the first traffic parameter data comprises one or more of a signal phase, time data, and/or road topology data.

19. A vehicle of a traffic system, comprising:
a quality determining device, comprising (i) a network interface for acquiring first traffic parameter data from the traffic system indicative of a parameter of the traffic system, and (ii) an image capturing device for acquiring second traffic parameter data indicative of the parameter of the traffic system, wherein the second traffic parameter data is associated with a plurality of traffic participants;
a processing device, operatively coupled to the image capturing device and network interface of the quality determining device, wherein the processing device is configured to
obtain the parameter from the first traffic parameter data;
obtain the parameter from the second traffic parameter data;
compare the parameter obtained from the first traffic parameter data to the parameter obtained from the second traffic parameter data in order to determine the quality of the first traffic parameter data; and
adjust a route guidance based on the parameter.

20. The vehicle of claim 19, wherein the processing device is configured to:
determine the quality of the first traffic parameter data based on the comparison; and
decide, based on the quality, whether the first traffic parameter data are to be considered in a future use of the traffic system.

* * * * *